United States Patent
Fukuyama et al.

(10) Patent No.: US 11,996,591 B2
(45) Date of Patent: May 28, 2024

(54) ATTACHMENT STRUCTURE FOR DEFORMATION ABSORPTION MEMBER AND ATTACHMENT METHOD

(71) Applicants: Nissan Motor Co., Ltd., Yokohama (JP); NHK Spring Co., Ltd., Yokohama (JP)

(72) Inventors: Yosuke Fukuyama, Kanagawa (JP); Takeshi Shiomi, Kanagawa (JP); Yusuke Terada, Kanagawa (JP); Norihiro Tajima, Kanagawa (JP)

(73) Assignees: Nissan Motor Co., Ltd., Yokohama (JP); NHK Spring Co., Ltd., Yokohama (JP)

( * ) Notice: Subject to any disclaimer, the term of this patent is extended or adjusted under 35 U.S.C. 154(b) by 791 days.

(21) Appl. No.: 14/901,274

(22) PCT Filed: Jun. 2, 2014

(86) PCT No.: PCT/JP2014/064629
§ 371 (c)(1),
(2) Date: Dec. 28, 2015

(87) PCT Pub. No.: WO2015/011990
PCT Pub. Date: Jan. 29, 2015

(65) Prior Publication Data
US 2016/0372762 A1      Dec. 22, 2016

(30) Foreign Application Priority Data

Jul. 22, 2013   (JP) .................................. 2013-152013

(51) Int. Cl.
*H01M 8/0202*      (2016.01)
*H01M 8/00*        (2016.01)
(Continued)

(52) U.S. Cl.
CPC ....... *H01M 8/0271* (2013.01); *H01M 8/0202* (2013.01); *H01M 8/0206* (2013.01);
(Continued)

(58) Field of Classification Search
None
See application file for complete search history.

(56) References Cited

U.S. PATENT DOCUMENTS

| | | | |
|---|---|---|---|
| 2005/0136312 A1* | 6/2005 | Bourgeois | H01M 8/0232 429/406 |
| 2009/0092872 A1* | 4/2009 | Miyazawa | H01M 8/0206 429/434 |
| 2009/0136805 A1* | 5/2009 | Sato | H01M 8/0258 429/434 |

FOREIGN PATENT DOCUMENTS

| | | |
|---|---|---|
| CN | 104170148 A | 11/2014 |
| JP | 2002298902 A | * 10/2002 |

(Continued)

OTHER PUBLICATIONS

Machine translation of JP 2002-298902 A (Hayashi) (Year: 2002).*

*Primary Examiner* — Barbara L Gilliam
*Assistant Examiner* — Helen M McDermott
(74) *Attorney, Agent, or Firm* — Global IP Counselors, LLP (57) ABSTRACT

An attachment structure for a deformation absorption member of a fuel-cell-stack includes a first raised piece raised from one surface of a base material in a grid pattern, and having an extension portion extending from a proximal end, the extension portion abutting at least one of the cathode side separator or the anode side separator, a second raised piece having a proximal end, and a joint portion formed by partially joining a location between the proximal end of the first raised piece and the proximal end of the second raised piece, proximal end of the first raised piece being adjacent (Continued)

the proximal end of the second raised piece in a second direction that intersects a first direction taken from the proximal end of the first raised piece to an extension portion side, to the at least one of the anode side separator and the cathode side separator.

8 Claims, 8 Drawing Sheets

(51) Int. Cl.
| | | |
|---|---|---|
| *H01M 8/0206* | (2016.01) | |
| *H01M 8/0247* | (2016.01) | |
| *H01M 8/0254* | (2016.01) | |
| *H01M 8/0267* | (2016.01) | |
| *H01M 8/0271* | (2016.01) | |
| *H01M 8/0273* | (2016.01) | |
| *H01M 8/0297* | (2016.01) | |
| *H01M 8/1007* | (2016.01) | |
| *H01M 8/242* | (2016.01) | |
| *H01M 8/2457* | (2016.01) | |
| *H01M 8/248* | (2016.01) | |
| *H01M 8/10* | (2016.01) | |
| *H01M 8/1039* | (2016.01) | |

(52) U.S. Cl.
CPC ....... *H01M 8/0247* (2013.01); *H01M 8/0267* (2013.01); *H01M 8/0273* (2013.01); *H01M 8/0297* (2013.01); *H01M 8/1007* (2016.02); *H01M 8/242* (2013.01); *H01M 8/2457* (2016.02); *H01M 8/248* (2013.01); *H01M 8/006* (2013.01); *H01M 8/0254* (2013.01); *H01M 8/1039* (2013.01); *H01M 2008/1095* (2013.01); *Y02E 60/50* (2013.01)

(56) References Cited

FOREIGN PATENT DOCUMENTS

| JP | 4432518 B2 | 1/2010 |
| JP | 2012-129108 A | 7/2012 |
| JP | 2013-097982 A | 5/2013 |
| WO | 2013/137470 A1 | 9/2013 |

* cited by examiner

ATTACHMENT STRUCTURE FOR DEFORMATION ABSORPTION MEMBER AND ATTACHMENT METHOD

CROSS-REFERENCE TO RELATED APPLICATIONS

This application is a U.S. National stage application of International Application No. PCT/JP2014/064629, filed Jun. 2, 2014, which claims priority to Japanese Patent Application No. 2013-152013 filed in Japan on Jul. 22, 2013, the contents of each of which are herein incorporated by reference.

BACKGROUND

Field of the Invention

The present invention relates to an attachment structure and an attachment method for a deformation absorption member.

Background Information

Conventionally, a fuel-cell-stack is configured by alternately laminating together a plurality of separators and the membrane electrode assemblies. Since, in a fuel-cell-stack, a high output can be obtained in accordance with the number of the laminations of the separators and the membrane electrode assemblies, increasing the number of the laminations is desirable. Conduction resistance can be reduced and a desired battery performance can be achieved by sufficiently putting the plurality of laminated separators and the membrane electrode assemblies in close contact with each other.

In a separator unit comprising an anode side separator and a cathode side separator, the portion of the flow channel for the fuel gas (hydrogen) and the cooling water of the anode side separator, and the portion of the flow channel for the oxidant gas (air containing oxygen or pure oxygen) and the cooling water of the cathode side separator, are formed from fine convex/concave shapes, and have high dimensional tolerances.

Accordingly, there is a configuration to arrange a pressurizing plate corresponding to a deformation absorption member comprising a spring function between the flow channel portion of the anode side separator and the flow channel portion of the cathode side separator of the separator unit. By using such a deformation absorption member, uniformly applying pressure becomes possible without damaging the convex/concave shaped portion that becomes the flow channel, even if a high pressing force is applied to the separator unit (for example refer to Japanese Patent No. 4432518).

SUMMARY

Here, a technique has been in demand, in which, even if a load is applied to a deformation absorption member disposed inside a separator unit by applying a pressure thereto, the distal end side of a raised piece equipped with a spring function being greatly deformed and the proximal end being lifted up due to the stress from the distal end side, or the proximal end being subjected to an excessive plastic deformation, can be prevented.

In order to solve the problem described above, an object of the present invention is to provide an attachment structure and an attachment method for a deformation absorption member that is capable of preventing the proximal end from being lifted up as well as preventing the proximal end from being subjected to an excessive plastic deformation.

The attachment structure for a deformation absorption member according to the present invention which achieves the object above is an attachment structure for a deformation absorption member that is used disposed between an anode side separator and a cathode side separator. The deformation absorption member comprises the raised pieces and the joint portions. The raised pieces are raised from one surface of a base material in a grid pattern, and the extension portions which are extended from the proximal ends abut a cathode side separator or an anode side separator. The joint portion is formed by partially joining a location between, from among a plurality of raised pieces, the proximal end of one raised piece, and the proximal end of another raised piece which is adjacent in another direction that intersects a one direction taken along from the proximal end of the one raised piece to the extension portion side, to the anode side separator or the cathode side separator.

The attachment method for a deformation absorption member according to the present invention which achieves the object above is an attachment method for a deformation absorption member that is disposed between an anode side separator and a cathode side separator. The deformation absorption member to be disposed between an anode side separator and a cathode side separator, and comprises a thin-board-like base material, and a plurality of raised pieces, which are raised from one surface of the base material in a grid pattern. The fuel-cell-stack manufacturing method comprises an arrangement step and a joining step. In the arrangement step, an extension portion extended from the proximal end of a raised piece disposed on one surface of the base material is disposed so as to be abutted to the cathode side separator or the anode side separator. In the joining step, a joint portion is formed by partially joining a location between, from among a plurality of raised pieces, the proximal end of one raised piece, and the proximal end of another raised piece which is adjacent in another direction that intersects a one direction taken along from the proximal end of the one raised piece to the extension portion side, to the anode side separator or the cathode side separator.

BRIEF DESCRIPTION OF THE DRAWINGS

Referring now to the attached drawings which form a part of this original disclosure.

DETAILED DESCRIPTION OF THE EMBODIMENTS

The first to the third embodiments according to the present invention will be described below, with reference to the appended drawings. In the explanations of the drawings, the same elements are given the same codes, and overlapping explanations are omitted. The sizes and ratios of the members in the drawing are exaggerated for convenience of explanation, and may be different from the actual sizes and ratios.

First Embodiment

The attachment structure and the attachment method for a deformation absorption member 20 of the first embodiment will be described, with reference to FIG. 1-FIG. 8B.

Figure 1:
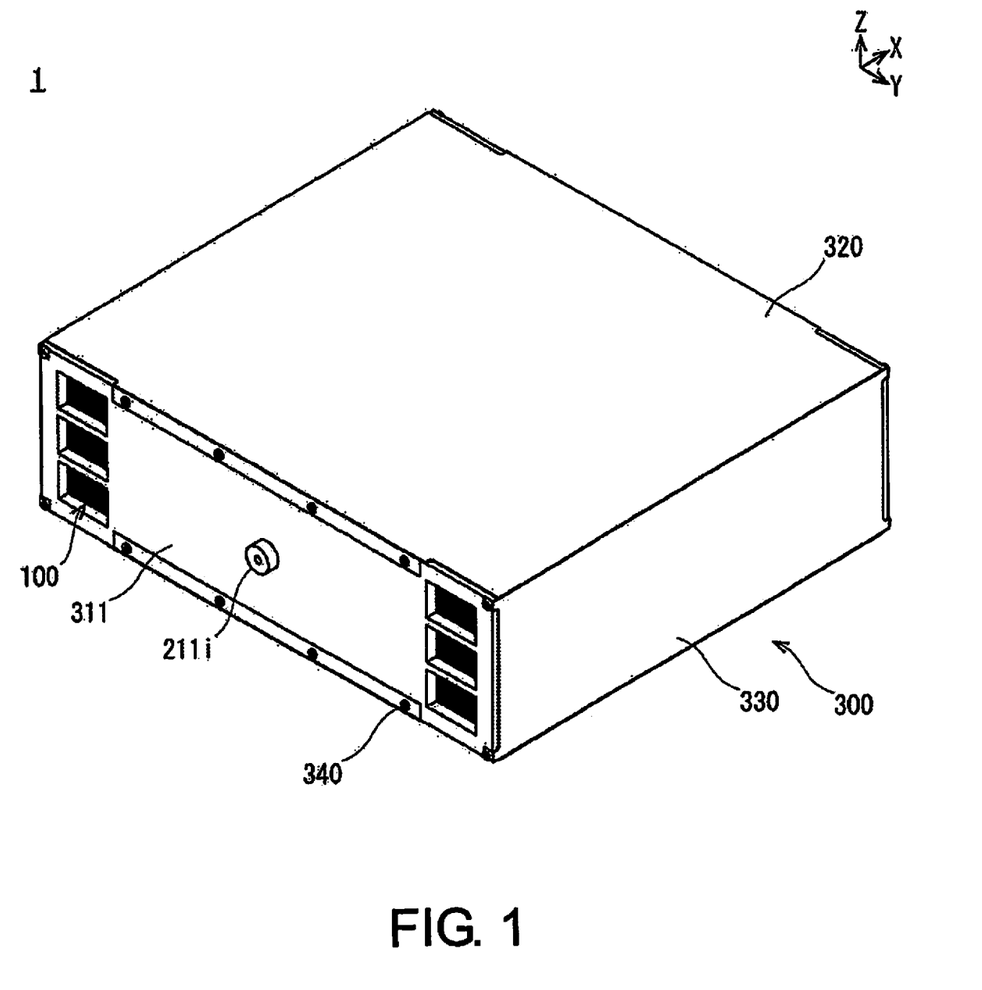
FIG. 1 is a perspective view illustrating a fuel-cell-stack according to the attachment structure and the attachment method for a deformation absorption member of the first embodiment.
Figure 2:
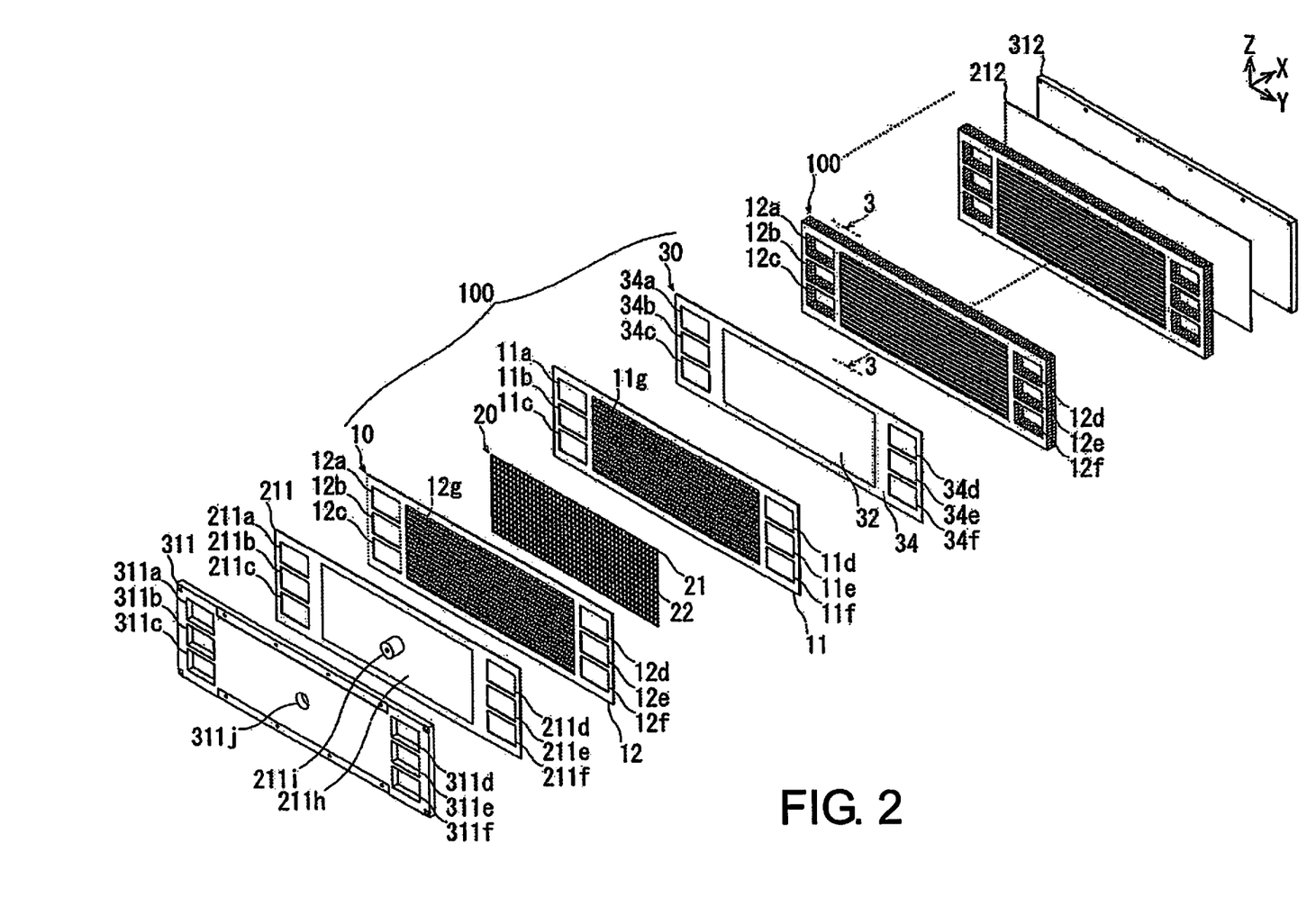
FIG. 2 is an exploded perspective view illustrating a fuel-cell-stack according to the attachment structure and the attachment method for a deformation absorption member of the first embodiment, exploded per each component member.
Figure 3:
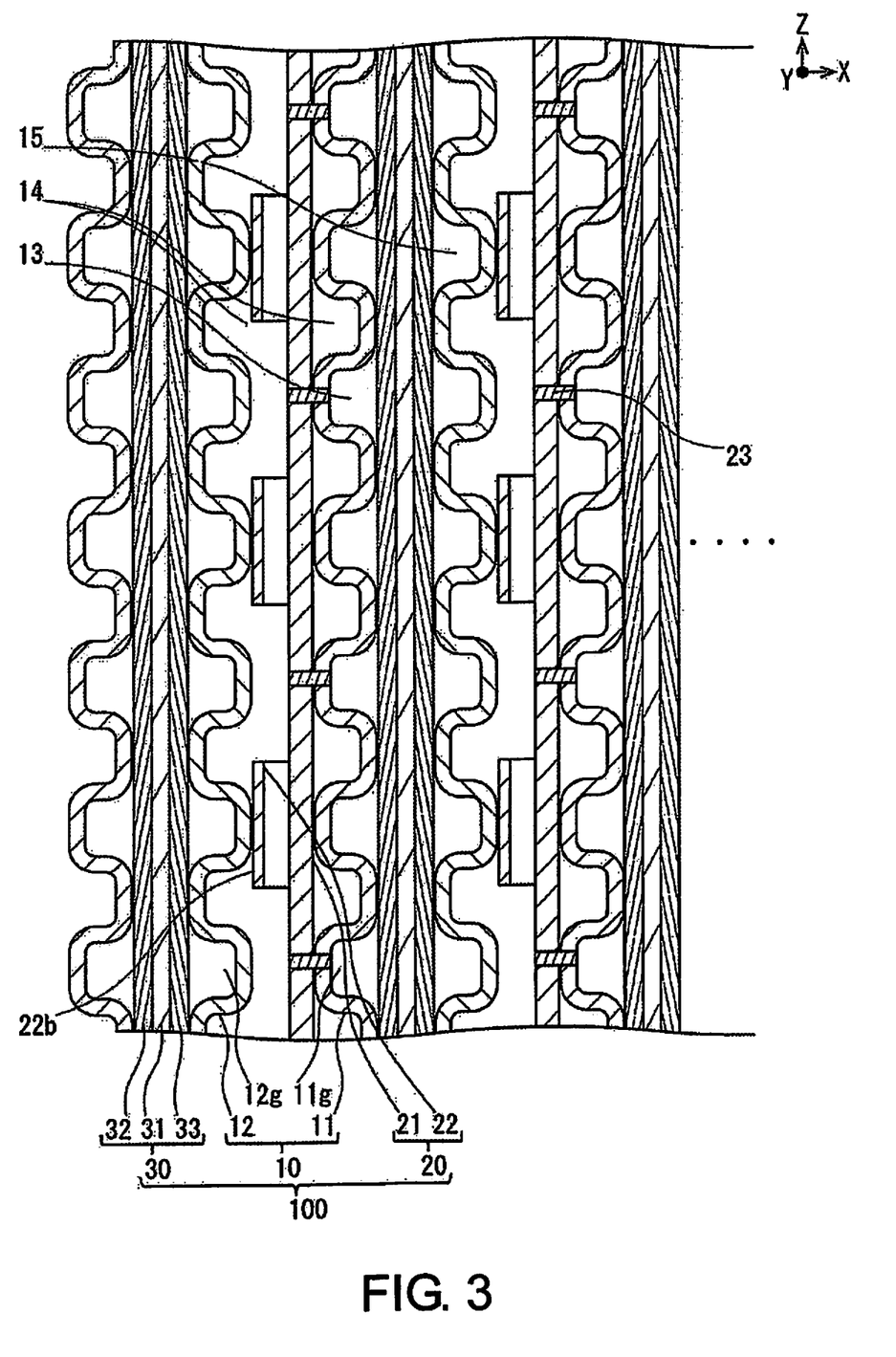
FIG. 3 is a cross-sectional view illustrating the separator unit, the deformation absorption member, and a part of the membrane electrode assembly, of the fuel-cell-stack according to the attachment structure and the attachment method for a deformation absorption member of the first embodiment.

FIG. 1 is perspective view illustrating a fuel-cell-stack 1 according to the attachment structure and the attachment method for a deformation absorption member 20 of the first embodiment. FIG. 2 is an exploded perspective view illustrating a part of the fuel-cell-stack 1, exploded per each component member. FIG. 3 is a cross-sectional view illustrating the separator unit 10, the deformation absorption member 20, and a part of the membrane electrode assembly 30, of the fuel-cell-stack 1. FIG. 3 shows along the 3-3 line in FIG. 2.

Figure 4:
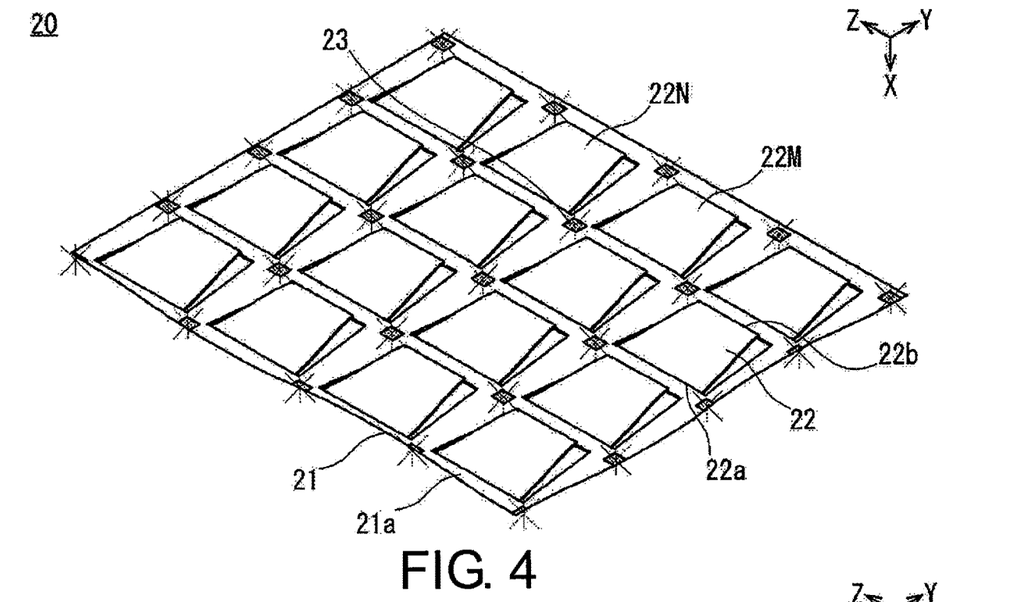
FIG. 4 is a perspective view illustrating the state of the deformation absorption member after being joined to the separator unit in the fuel-cell-stack according to the attachment structure and the attachment method for a deformation absorption member of the first embodiment, using a part of the deformation absorption member.
Figure 5:
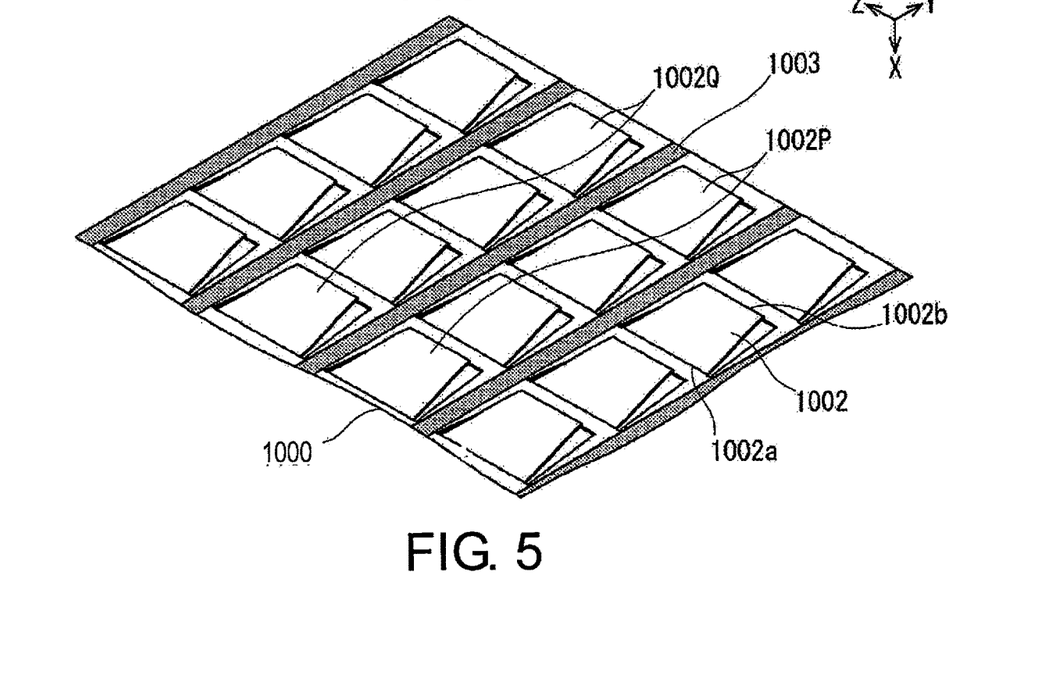
FIG. 5 is a perspective view illustrating the state of the deformation absorption member after being joined to the separator unit in the fuel-cell-stack according to the attachment structure and the attachment method for a deformation absorption member of a Comparative Example, using a part of the deformation absorption member.
Figure 6:
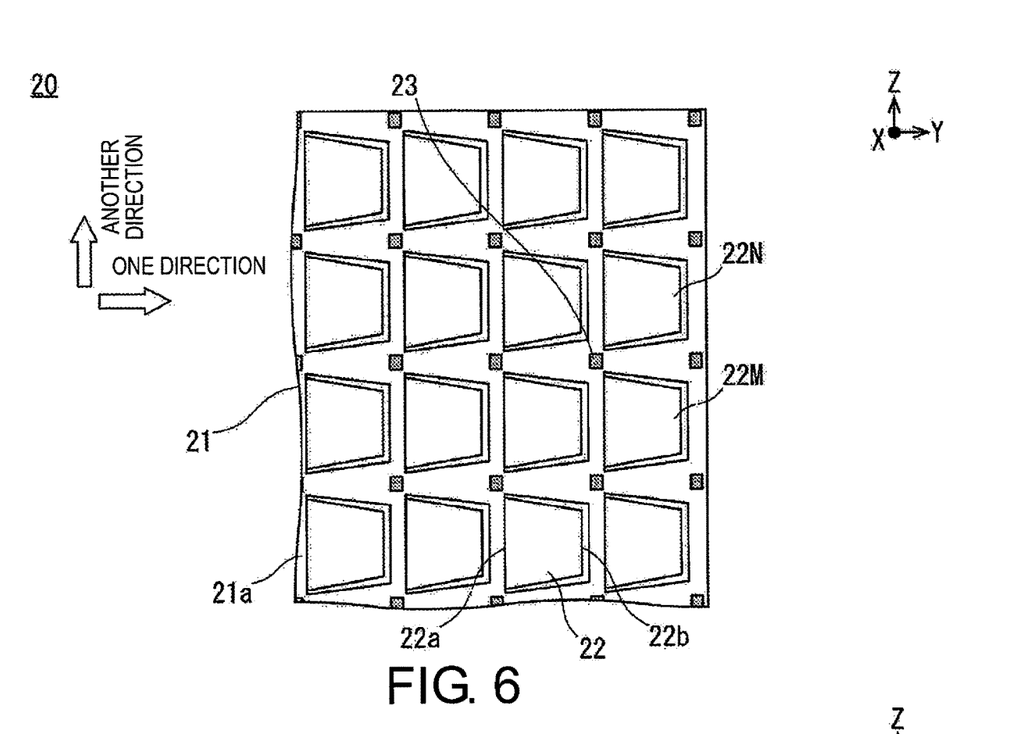
FIG. 6 is a plan view illustrating the state of the deformation absorption member after being joined to the separator unit in the fuel-cell-stack according to the attachment structure and the attachment method for a deformation absorption member of the first embodiment, using a part of the deformation absorption member.
Figure 7:
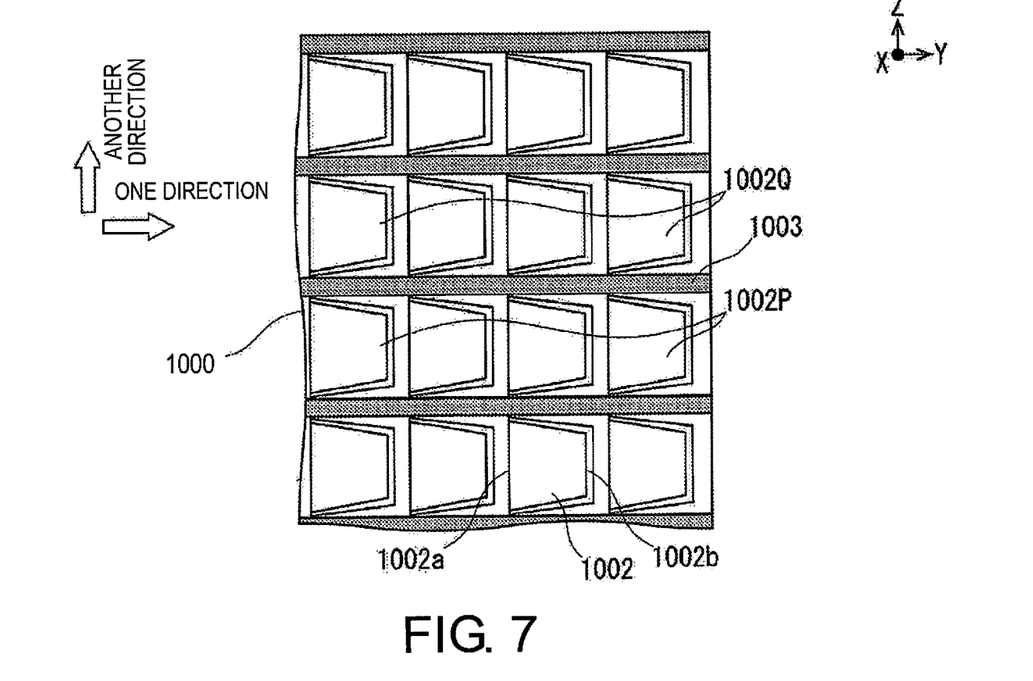
FIG. 7 is a plan view illustrating the state of the deformation absorption member after being joined to the separator unit in the fuel-cell-stack according to the attachment structure and the attachment method for a deformation absorption member of a Comparative Example, using a part of the deformation absorption member.
Figure 8A:
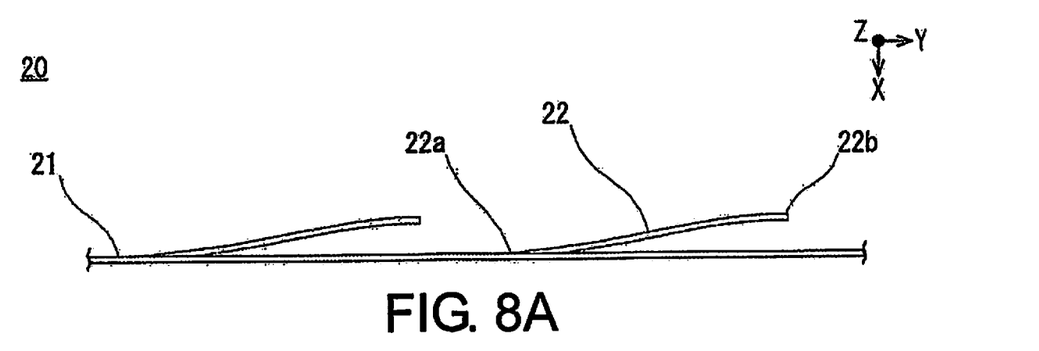
FIGS. 8A and 8B are a side view illustrating the state of the deformation absorption member which is joined to the separator unit in the fuel-cell-stack according to the attachment structure and the attachment method for a deformation absorption member of the first embodiment, using a part of the deformation absorption member.
Figure 8B:
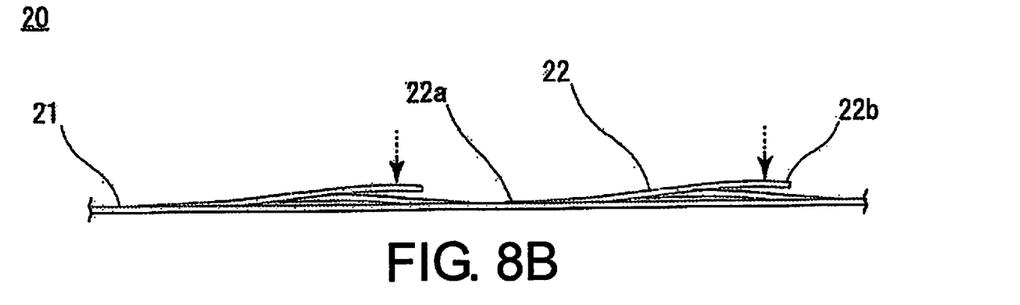

FIG. 4 is perspective view illustrating the state of the deformation absorption member 20 after being joined to the separator unit 10 in the fuel-cell-stack 1, using a part of the deformation absorption member 20. FIG. 5 is a perspective view illustrating the state of the deformation absorption member 1000 after being joined to the separator unit 10 in the fuel-cell-stack according to a Comparative Example, using a part of the deformation absorption member 1000. FIG. 6 is a plan view illustrating the state of the deformation absorption member 20 after being joined to the separator unit 10 in the fuel-cell-stack 1, using a part of the deformation absorption member 20. FIG. 7 is a plan view illustrating the state of the deformation absorption member 1000 after being joined to the separator unit 10 in the fuel-cell-stack according to the Comparative Example, using a part of the deformation absorption member 1000. FIGS. 8A and 8B are side views illustrating the state of the deformation absorption member 20 which is joined to the separator unit 10 in the fuel-cell-stack 1, using a part of the deformation absorption member 20. FIG. 8A illustrates a state in which the deformation absorption member 20 is not deformed. FIG. 8B illustrates a state in which the deformation absorption member 20 is greatly deformed in a location other than the fixed end portion 22a.

The attachment structure and the attachment method for a deformation absorption member 20 of the first embodiment will be described in accordance with an attachment structure that realizes the attachment method for the deformation absorption member 20. The deformation absorption member 20 according to the attachment structure is disposed in the fuel-cell-stack 1. The fuel-cell-stack 1 comprises fuel cells 100 which generate power, a pair of collector plates 211 and 212 for transmitting the power generated by the fuel cells 100 to the outside, and a chassis 300 that holds a plurality of fuel cells 100 laminated together and a pair of collector plates 211 and 212. Each configuration of the fuel-cell-stack 1 will be explained in the order below.

The fuel cell 100 is illustrated in FIG. 1-FIG. 3, and generates power from a supplied fuel gas (hydrogen) and an oxidant gas (air containing oxygen or pure oxygen), in a state in which a plurality thereof are laminated together.

The fuel cell 100 comprises a separator unit 10, a deformation absorption member 20, and a membrane electrode assembly 30. Each member included in the fuel cell 100 will be described below.

The separator unit 10 is illustrated in FIG. 2 and FIG. 3, isolates the adjacent membrane electrode assemblies 30 while conducting power that is generated in the membrane electrode assembly 30, and comprises the flow channels for the cooling water and the fuel gas (hydrogen) or the oxidant gas (air containing oxygen or pure oxygen). The separator unit 10 comprises an anode side separator 11 and a cathode side separator 12. The anode side separator 11 is abutted with an anode 32 of the membrane electrode assembly 30. The anode side separator 11 is made of a conductive metal material, and is formed into a thin plate shape that is larger than the anode 32.

A plurality of convex/concave shapes are formed at regular intervals in the center of the anode side separator 11 so as to configure a flow channel portion 11g to flow the fuel gas (hydrogen) and the cooling water at intervals, as illustrated in FIG. 3. Of the convex/concave shapes, the anode side separator 11 uses the closed space formed by contacting the anode 32 as an anode gas flow channel 13 for supplying the hydrogen to the anode 32. On the other hand, of the convex/concave shapes, the anode side separator 11 uses the closed space formed between the cathode side separator 12, interposing the deformation absorption member 20, as a cooling water flow channel 14 for supplying cooling water.

The anode side separator 11 is formed from the rectangles, and the through-holes corresponding to a cathode gas inlet 11a, a cooling fluid inlet 11b, and an anode gas inlet 11c are opened on one end in the longitudinal direction. Similarly, the through-holes corresponding to an anode gas outlet 11d, a cooling fluid outlet 11e, and a cathode gas outlet 11f are opened on the other end of the anode side separator 11 in the longitudinal direction.

The cathode side separator 12 is abutted with a cathode 33 of the membrane electrode assembly 30. The cathode side separator 12 is made of a conductive metal material, and is formed into a thin plate shape that is larger than the cathode 33.

A plurality of convex/concave shapes are formed at regular intervals in the center of the cathode side separator 12 so as to configure a flow channel portion 12g to flow the oxidant gas (air containing oxygen or pure oxygen) and the cooling water at intervals, as illustrated in FIG. 3. The convex/concave shapes are made by alternately combining the U-shapes, or alternately combining the semi-circular shapes. Of the convex/concave shapes, the cathode side separator 12 uses the closed space formed by contacting the cathode 33 as a cathode gas flow channel 15 for supplying the oxidant gas to the cathode 33. On the other hand, of the convex/concave shapes, the cathode side separator 12 uses the closed space formed between the cathode side separator 12, interposing the deformation absorption member 20, as a cooling water flow channel 14 for supplying the cooling water. That is, in the adjacent fuel cells 100, a cooling water flow channel 14 of an anode side separator 11 of one fuel cell 100 and a cooling water flow channel 14 provided to a cathode side separator 12 of the other fuel cell 100 form one cooling water flow channel.

The cathode side separator 12 is made of the rectangles, and the through-holes corresponding to a cathode gas inlet 12a, a cooling fluid inlet 12b, and an anode gas inlet 12c are opened on one end in the longitudinal direction. Similarly, the through-holes corresponding to an anode gas outlet 12d, a cooling fluid outlet 12e, and a cathode gas outlet 12f are opened on the other end of the cathode side separator 12 in the longitudinal direction.

The deformation absorption member 20 is illustrated in FIG. 2-FIG. 4, FIG. 6, and FIGS. 8A and 8B and absorbs the manufacturing errors in the convex/concave shapes which form the fuel gas and the cooling water flow channels of the anode side separator 11 and the cathode side separator 12 by deforming itself at the time of assembling the fuel-cell-stack 1. In addition, the deformation absorption member 20 absorbs displacements in the lamination direction X, caused by an expansion of the membrane electrode assembly 30 when absorbing the supplied medium, by deforming itself. In addition, the deformation absorption member 20 absorbs displacements in the lamination direction X, caused by a thermal expansion of a separator unit 10 that is heated by an adjacent membrane electrode assembly 30, by deforming itself during an operation of the fuel cell 100. Therefore, putting the plurality of laminated fuel cells 100 into close contact with each other by applying a high pressure is possible. The closer the plurality of laminated fuel cells 100 are in contact with each other, the more the conduction resistance between the fuel cells 100 is reduced, to improve the power generation efficiency.

The deformation absorption member 20 is made of a metal having electrical conductivity, and is formed in a thin plate shape, as illustrated in FIG. 4, FIG. 6, and FIG. 8. The deformation absorption member 20 is disposed between the anode side separator 11 and the cathode side separator 12, and comprises a thin-board-like base material 21, and a plurality of raised pieces 22, each of which is raised from one surface 21a of the base material 21 in a grid pattern. That is, in the deformation absorption member 20, raised pieces 22 are made by punching out the U-shapes from the base material 21, corresponding to one thin plate, which are then raised and cantilevered, and arranged in a grid pattern. Since the raised pieces 22 comprise a cantilever structure with respect to the base material 21, the pieces have the function of a spring that can be elastically deformed.

In the deformation absorption member 20, the free end portion 22b on the extension portion side extended from the fixed end portion 22a on the proximal end side of the raised pieces 22 disposed on one surface 21a of the base material 21, abuts against the cathode side separator 12, as illustrated in FIG. 3. Furthermore, the deformation absorption member 20 forms a joint portion 23 by partially joining a location between, from among a plurality of raised pieces 22, the fixed end portion 22a of one raised piece 22M and the fixed end portion 22a of another raised piece 22N to the anode side separator 11. Here, the fixed end portion 22a of the one raised piece 22M is adjacent to the fixed end portion 22a of the other raised piece 22N, in another direction Z which intersects with a one direction Y taken along from the fixed end portion 22a side of the one raised piece 22M to the fixed end portion 22a side of the other raised piece 22M, as illustrated in FIG. 4 and FIG. 6.

On the other hand, the deformation absorption member 1000 according to a Comparative Example forms a continuous strip-shaped joint portion 1003 in a region between a fixed end portion 1002a of a raised piece 1002P of one row and a fixed end portion 1002a of a raised piece 1002Q of another row adjacent to the one row, as illustrated in FIG. 5 and FIG. 7. The joint portion 1003 is joined to the anode side separator 11 or the cathode side separator 12. According to a configuration of a fuel-cell-stack of such a Comparative Example, the fixed end portion 1002a side of the raised piece 1002 is excessively fixed to the anode side separator 11 or the cathode side separator 12, and thus is difficult to deform when a load is applied thereto via the free end portion 1002b. Therefore, in the fuel-cell-stack according to the Comparative Example, when a load is applied to the free end portion 1002b of the raised piece 1002, while the fixed end portion 1002a is being lifted up can be prevented, the free end portion 1000b is subjected to excessive plastic deformation. In such a deformation absorption member 1000, improving the withstand load of the raised piece 1002 is difficult.

The membrane electrode assembly 30 is illustrated in FIG. 2 and FIG. 3, and generates electric power by chemically reacting the supplied oxygen and hydrogen. The membrane electrode assembly 30 is formed by joining an anode 32 and a cathode 33 so as to face each other via an electrolyte membrane 31. The membrane electrode assembly 30 is commonly referred to as a MEA (membrane electrode assembly). The electrolyte membrane 31 is, for example, made of a solid polymer material, and is formed in a thin plate shape. For example, a fluorine-based resin which conducts hydrogen ions and has good electrical conductivity in a wetted state is used as the solid polymer material. The anode 32 is configured by laminating an electrode catalyst layer, a water-repellent layer, and a gas diffusion layer, and is formed in a thin plate shape that is slightly smaller than the electrolyte membrane 31. The cathode 33 is configured by laminating an electrode catalyst layer, a water-repellent layer, and a gas diffusion layer, and is formed in a thin plate shape with the same size as the anode 32. The electrode catalyst layers of the anode 32 and the cathode 33 include a polymer electrolyte and an electrode catalyst in which the catalyst component is carried on a conductive carrier. The gas diffusion layers of the anode 32 and the cathode 33 are formed from carbon cloth, carbon paper, or carbon felt, which are woven with yarns comprising carbon fibers that have sufficient gas diffusibility and conductivity.

The membrane electrode assembly 30 comprises a frame 34. The frame 34 integrally holds the outer perimeters of the electrolyte membrane 31, the anode 32, and the cathode 33. The frame 34 is made of, for example, a resin having electrical insulating properties, and is formed with an external shape that is the same as the external shape of the outer perimeter portion of the separator unit 10. Through-holes corresponding to a cathode gas inlet 34a, a cooling fluid inlet 34b, and an anode gas inlet 34c are opened on one end of the frame 34 in the longitudinal direction. Similarly, through-holes corresponding to an anode gas outlet 34d, a cooling fluid outlet 34e, and a cathode gas outlet 34f are opened on the other end of the frame 34 in the longitudinal direction.

A plurality of fuel cells 100 need to be laminated together so as to be sealed to each other. Accordingly, the outer perimeters of the adjacent fuel cells 100 are sealed with a sealing member. For example, a thermosetting resin is used as the sealing member. The thermosetting resin is selected from, for example, the phenol resins, the epoxy resins, the unsaturated polyesters, or the like.

The pair of collector plates 211 and 212 are illustrated in FIG. 2, and transmit the power generated by the fuel cells 100 to the outside.

The pair of collector plates 211 and 212 are respectively disposed on the two ends of the plurality of fuel cells 100 laminated together. The external shape of the pair of collector plates 211 and 212, with the exception of some of the shapes, is the same as the external shape of the membrane electrode assembly 30 with a slightly thicker layer thickness. Among the pair of collector plates 211 and 212, through-holes corresponding to a cathode gas inlet 211a, a cooling fluid inlet 211b, and an anode gas inlet 211c are opened on one end of only the collector plate 211 in the longitudinal direction. Similarly, through-holes corresponding to an anode gas outlet 211d, a cooling fluid outlet 211e, and a cathode gas outlet 211f are opened on the other end of only the collector plate 211 in the longitudinal direction. The pair of collector plates 211 and 212 include a collector portion 211h, etc., in the center.

The collector portion 211h, etc., of the pair of collector plates 211 and 212 is made of a conductive member that does not permeate gas, such as a dense carbon, and is formed in a thin plate shape that is slightly smaller than the outer shapes of the anode 32 and the cathode 33. The pair of collector portions 211h, etc., abut with the anode 32 or the cathode 33 of the membrane electrode assembly 30 disposed on the outermost of the plurality of laminated fuel cells 100. A conductive cylindrical protrusion 211i, etc., protrudes from one surface of the collector portion 211h, etc. The protrusion 211i, etc., extend through the through-holes 311j, etc., of a pair of end plates 311 and 312 of the chassis 300 described below.

The chassis 300 is illustrated in FIG. 1 and FIG. 2, and holds the plurality of fuel cells 100 laminated together and the pair of the collector plates 211 and 212, in a state of being in close contact with each other.

The chassis 300 comprises a pair of the end plates 311 and 312, a pair of the fastening plates 320, a pair of the reinforcing plates 330, and the screws 340. Each member included in the chassis 300 will be described below. The pair of the end plates 311 and 312 sandwich and bias the pair of the collector plates 211 and 212, disposed on the two ends of the plurality of fuel cells 100 laminated together. The external shape of the pair of the collector plates 311 and 312, with the exception of some of the shape, is the same as the external shape of the membrane electrode assembly 30 with an increased layer thickness. The pair of the end plates 311 and 312 are, for example, made of metal, and an insulator is disposed in a portion that abuts with the pair of the collector plates 211 and 212. Among the pair of the end plates 311 and 312, the through-holes corresponding to a cathode gas inlet 311a, a cooling fluid inlet 311b, and an anode gas inlet 311c are opened on one end of only the end plate 311 in the longitudinal direction. Similarly, the through-holes corresponding to an anode gas outlet 311d, a cooling fluid outlet 311e, and a cathode gas outlet 311f are opened on the other end of only the end plate 311 in the longitudinal direction. A through-hole 311j, etc., for extending through the protrusion 211i, etc., of the pair of collector plates 211 and 212 are opened on the pair of end plates 311 and 312.

The pair of fastening plates 320 are made of, for example, a metal, and are formed in a plate shape. The pair of the fastening plates 320 holds the pair of the end plates 311 and 312 from both sides in the longitudinal direction so as to face each other. The pair of the reinforcing plates 330 are made of, for example, a metal, and are formed in a plate shape that is more elongated than the pair of the fastening plates 320. The pair of the reinforcing plates 330 holds the pair of the end plates 311 and 312 from both sides in the lateral direction so as to face each other. The pair of the fastening plates 320 and the pair of the reinforcing plates 330 are fixed to the pair of the end plates 311 and 312 by a plurality of screws 340.

According to the attachment structure and the attachment method for a deformation absorption member 20 according to the first embodiment described above, the following actions and effects can be achieved.

The attachment structure for a deformation absorption member 20 according to the first embodiment is an attachment structure for a deformation absorption member 20 that is used disposed between an anode side separator 11 and a cathode side separator 12. The deformation absorption member 20 comprises the raised pieces 22 and the joint portions 23. The raised pieces 22 are raised from one surface 21a of a base material 21 in a grid pattern, and the extension portions which extend from the proximal ends abut a cathode side separator 12 or an anode side separator 11. The joint portion 23 is formed by partially joining a location between, from among a plurality of raised pieces 22, the proximal end of one raised piece 22M, and the proximal end of another raised piece 22N which is adjacent in another (second) direction Z that intersects a one (first) direction Y taken along from the proximal end of the one raised piece 22M to the extension portion side, to the anode side separator 11 or the cathode side separator 12.

The attachment method for a deformation absorption member 20 according to the first embodiment is an attachment method for a deformation absorption member 20 that is used disposed between an anode side separator 11 and a cathode side separator 12. The deformation absorption member 20 to be used is disposed between an anode side separator 11 and a cathode side separator 12, and comprises a thin-board-like base material 21, and a plurality of raised pieces 22, which are raised from one surface 21a of the base material 21 in a grid pattern. The fuel-cell-stack 1 manufacturing method comprises an arrangement step and a joining step. In the arrangement step, an extension portion extended from the proximal end of a raised piece disposed on one surface of the base material is disposed so as to be abutted to the cathode side separator or the anode side separator. In the joining step, a joint portion is formed by partially joining a location between, from among a plurality of raised pieces, the proximal end of one raised piece 22M, and the proximal end of another raised piece 22N which is adjacent in another direction Z that intersects a one direction Y taken along from the proximal end of the one raised piece 22M to the extension portion side, to the anode side separator 11 or the cathode side separator 12.

In this type of an attachment structure and an attachment method for a deformation absorption member 20, a location between the proximal end (the fixed end portion 22a) of one raised piece 22M, and the proximal end (the fixed end portion 22a) of another raised piece 22N is partially joined to the anode side separator 11 or the cathode side separator 12. According to such a configuration, while being fixed to the anode side separator 11 or the cathode side separator 12, the proximal end (the fixed end portion 22a) side of the raised piece 22 can be deformed within a predetermined range. Therefore, the fuel-cell-stack 1 is capable of preventing the proximal end (the fixed end portion 22a) from being lifted up while preventing the proximal end (the fixed end portion 22a) from being subjected to excessive plastic deformation, even if a load is applied to the extension portion (the free end portion 22b) of the raised piece 22. Accordingly, increasing the load that can be received by the raised piece 22 of the deformation absorption member 20 is possible. For example, the separator unit is not easily damaged, even if the plurality of laminated separator units and the membrane electrode assemblies are put in close contact under a high pressure.

Furthermore, in the attachment structure and the attachment method for a deformation absorption member 20, the raised pieces 22 disposed in a grid pattern may be formed so that the directions of the extension portions (the free end portions 22b) are aligned in a plurality of rows along the other direction Z.

According to such a configuration, the deformation absorption member 20 is easy to manufacture, and the positioning thereof when joining to the anode side separator 11 or the cathode side separator 12 also is easy.

Furthermore, the attachment structure and the attachment method for a deformation absorption member 20 may be configured so that the joint portion 23 is formed by a welding, a brazing, a diffusion bonding, or a thermocompression bonding.

According to such a configuration, the deformation absorption member 20 can be partially joined to the anode side separator 11 or the cathode side separator 12 using a generic and simple joining method.

Second Embodiment

The attachment structure and the attachment method for a deformation absorption member 40 of the second embodiment will be described, with reference to FIG. 9 and FIG. 10.

Figure 9:
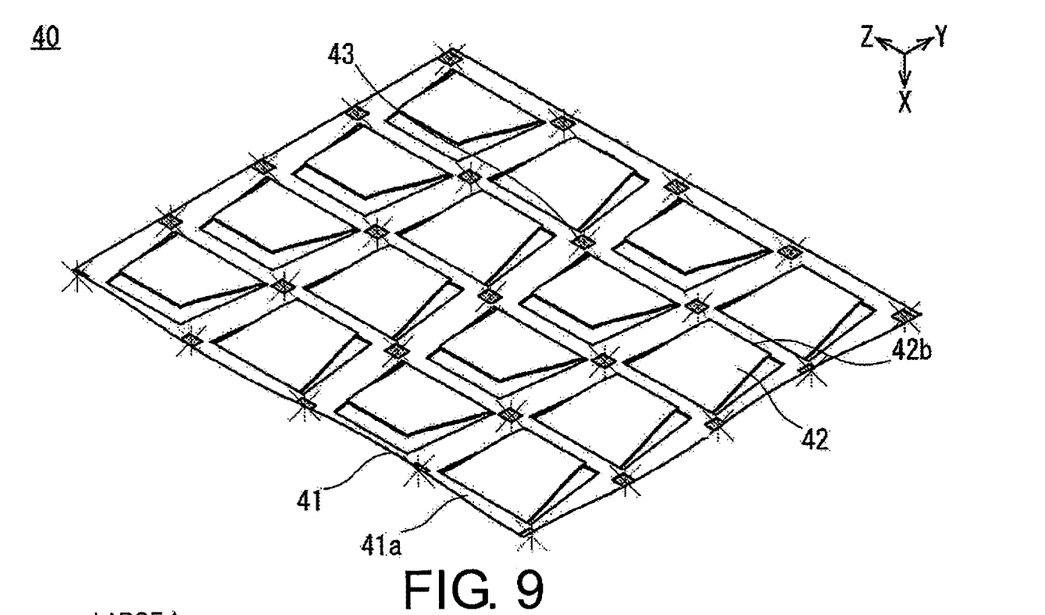
FIG. 9 is a perspective view illustrating the state of the deformation absorption member after being joined to the separator unit in the fuel-cell-stack according to the attachment structure and the attachment method for a deformation absorption member of the second embodiment, using a part of the deformation absorption member.

FIG. 9 is the perspective view illustrating the state of the deformation absorption member 40 after being joined to the separator unit 10 in a fuel-cell-stack, using a part of the deformation absorption member 40. FIG. 10 is a view illustrating the characteristics of the deformation absorption member 40 of the fuel-cell-stack.

The attachment structure and the attachment method for a deformation absorption member 40 of the second embodiment is different from the above-described first embodiment in the configuration in which the directions of the extension portions (the free end portions 42b) of the raised pieces 42 disposed in a grid pattern are alternated per each row.

In the second embodiment, the same codes are used for configurations that are the same as the first embodiment described above, and the explanations thereof are omitted.

FIG. 9 illustrates the shape of the deformation absorption member 40. Unlike the deformation absorption member 20 illustrated in FIG. 4 described above, the deformation absorption member 40 is formed so that the directions of the free end portions 42b of the raised pieces 42 are alternated per each row, in a plurality of rows along another direction Z which intersects the one direction Y. That is, the deformation absorption member 40 forms the raised pieces 42 so that the directions of the free end portions 42b are alternated per each row. The deformation absorption member 40 is made of the same material as the deformation absorption member 20. The joint portion 43 formed on one surface 41a of the deformation absorption member 40 is the same as the joint portion 23 formed on one surface 21a of the deformation absorption member 20.

Figure 10:
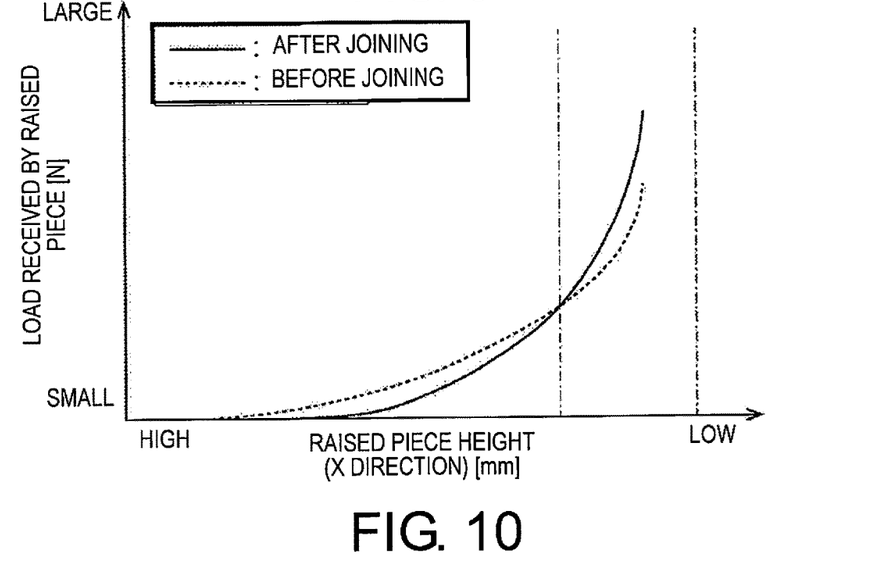
FIG. 10 is a view illustrating the characteristics of the deformation absorption member disposed in the fuel-cell-stack according to the attachment structure and the attachment method for a deformation absorption member of the second embodiment.

FIG. 10 illustrates the characteristics of the deformation absorption member 40 in a graph. The horizontal axis corresponds to the height of the raised piece 42 raised from the base material 41 of the deformation absorption member 40. The vertical axis corresponds to the load that is received by the raised piece 42. The solid line in the graph illustrates the state after partially joining the base material 41 of the deformation absorption member 40 to the anode side separator 11 or the cathode side separator 12. The dotted line in the graph illustrates the state before partially joining the base material 41 of the deformation absorption member 40 to the anode side separator 11 or the cathode side separator 12. In the deformation absorption member 40, especially in a region in which the height of the raised piece 42 raised from the base material 41 is sufficiently low, the load that can be received by the raised piece 42 is increased by joining the base material 41.

According to the attachment structure and the attachment method for a deformation absorption member 40 according to the second embodiment described above, the following actions and the effects can be achieved in addition to the actions and the effects according to the first embodiment described above.

In the attachment structure and the attachment method for a deformation absorption member 40 of the second embodiment, the raised pieces 42 disposed in a grid pattern may be formed so that the directions of the extension portions (the free end portions 42b) are varied to be opposed per each row, in a plurality of rows along the other direction Z.

According to such a configuration, in the deformation absorption member 40, especially in a region in which the height of the raised piece 42 raised from the base material 41 is sufficiently low, the load that can be received by the raised piece 42 can be increased by joining the base material 41, as illustrated in FIG. 10. That is, the deformation absorption member 40 illustrated in FIG. 9 is configured so that the free end portions 42b are more evenly distributed in the region of the one surface 41a, compared to the deformation absorption member 20 illustrated in FIG. 4 described above, by alternately positioning the free end portions 42b of the raised pieces 42 per each row. According to such a configuration, if the raised height of the raised pieces 42 raised from the base material 41 is sufficiently low and the amount of deformation of the raised pieces 42 is small, the withstand load of the deformation absorption member 40 can be improved.

Third Embodiment

The attachment structure and the attachment method for a deformation absorption member 50 of the third embodiment will be described, with reference to FIG. 11 and FIG. 12.

Figure 11:
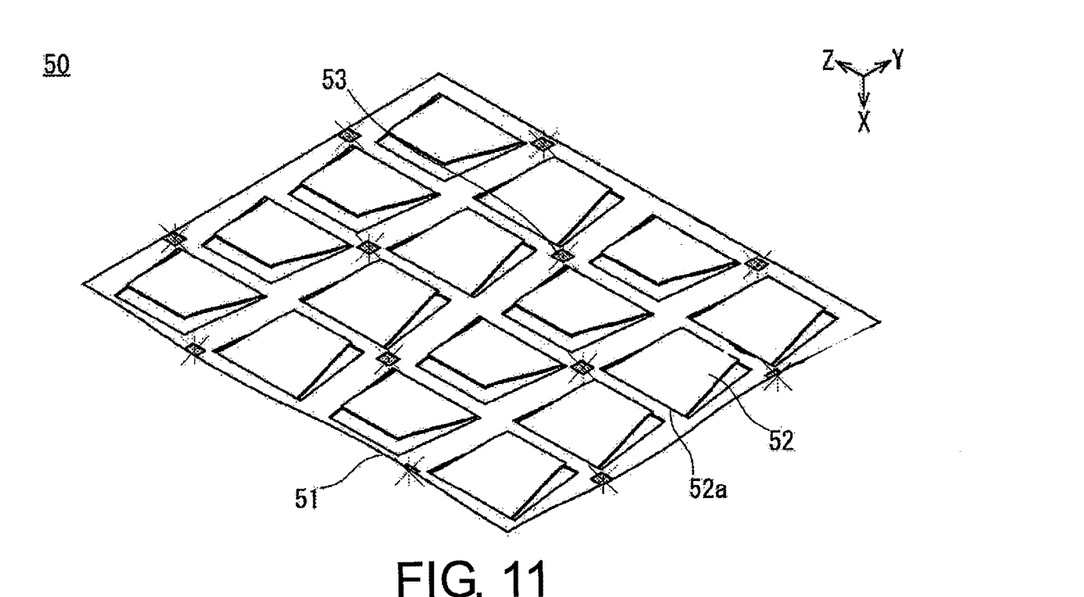
FIG. 11 is a perspective view illustrating the state of the deformation absorption member after being joined to the separator unit in the fuel-cell-stack according to the attachment structure and the attachment method for a deformation absorption member of the third embodiment, using a part of the deformation absorption member.

FIG. 11 is a perspective view illustrating the state of the deformation absorption member 50 after being joined to the separator unit 10 in a fuel-cell-stack, using a part of the deformation absorption member 50. FIG. 12 is a view illustrating the characteristics of the deformation absorption member 50 of the fuel-cell-stack.

The attachment structure and the attachment method for a deformation absorption member 50 of the third embodiment is different from the above-described second embodiment in the configuration in which the joint portions 53 of the raised pieces 52 disposed in a grid pattern are formed in a staggered pattern.

In the third embodiment, the same codes are used for the configurations that are the same as the first embodiment or the second embodiment described above, and the explanations thereof are omitted.

Unlike the deformation absorption member 40 illustrated in FIG. 9 described above, in the deformation absorption member 50 illustrated in FIG. 11, the joint portions 53 are formed in at least one corner of the four corners of a raised piece 52 adjacent to the fixed end portion 52a of any one of the plurality of raised pieces 52. In other words, in the deformation absorption member 50, in contrast to the raised pieces 52 which are provided in a grid pattern, the joint portions 53 are formed on the one surface 51a so as to be arranged in a staggered pattern. The outer shape and the material of the deformation absorption member 50 are the same as the outer shape and the material of the deformation absorption member 40.

Figure 12:
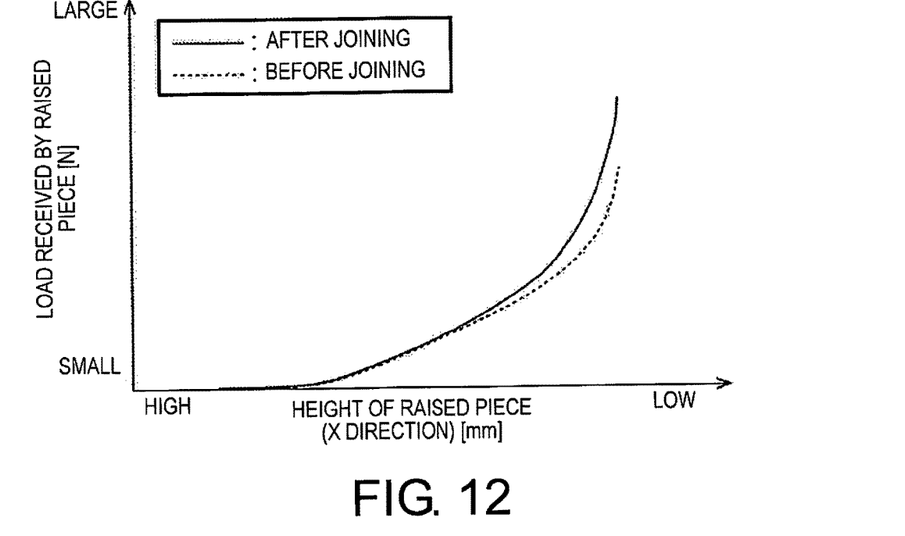
FIG. 12 is a view illustrating the characteristics of the deformation absorption member disposed in the fuel-cell-stack according to the attachment structure and the attachment method for a deformation absorption member of the third embodiment.

FIG. 12 illustrates the characteristics of the deformation absorption member 50 in a graph. The horizontal axis corresponds to the height of the raised piece 52 raised from the base material 51 of the deformation absorption member 50. The vertical axis corresponds to the load that is received by the raised piece 52. The solid line in the graph illustrates the state after partially joining the base material 51 of the deformation absorption member 50 to the anode side separator 11 or the cathode side separator 12. The dotted line in the graph illustrates the state before partially joining the base material 51 of the deformation absorption member 50 to the anode side separator 11 or the cathode side separator 12. In the deformation absorption member 50, in all the regions regardless of the raised height of the raised piece 52 raised from the base material 51, the load that can be received by the raised piece 52 is increased by joining the base material 51.

According to the attachment structure and the attachment method for a deformation absorption member 50 according to the third embodiment described above, the following actions and effects can be achieved in addition to the actions and effects according to the first and second embodiments described above.

In the attachment structure and the attachment method for a deformation absorption member 50 of the third embodiment, the plurality of raised pieces 52 are each formed in a rectangular shape. The joint portion 53 is formed in at least one corner of the four corners of a rectangular shape adjacent to the proximal end (the fixed end portion 52a) of any one of the plurality of raised pieces 52.

According to such a configuration, in the deformation absorption member 50, in all regions regardless of the raised height of the raised piece 52 raised from the base material 51, the load that can be received by the raised piece 52 can be increased, as illustrated in FIG. 12. That is, the deformation absorption member 50 illustrated in FIG. 11 is configured so that the fixed end portion 52a can be easily deformed flexibly, compared to the deformation absorption member 40 illustrated in FIG. 9 described above, by forming the joint portions 53 of the raised pieces 52 provided in a grid pattern, in a staggered pattern. According to such a configuration, the withstood load of the deformation absorption member 50 can be improved, regardless of the raised height of the raised piece 52 raised from the base material 51. Moreover, since the locations of the joint portions 53 can be greatly reduced, the manufacturing cost and the man-hours related to the forming of the joint portions 53 can be significantly reduced.

Besides the above, various modifications to the present invention based on the configurations described in the Claims are possible, which also belong in the scope of the present invention.

For example, the shape of the raised piece 22 was described as a trapezoidal shape in which the width of the extension portion (the free end portion 22b) is relatively shorter than the width of the proximal end (the fixed end portion 22a). However, the raised piece 22 is not limited to such a shape, and may be rectangular, triangular, semicircular, polygonal, or a shape that is a combination thereof.

The invention claimed is:

1. A deformation absorption member disposed between an anode side separator and a cathode side separator of a fuel cell stack, the deformation absorption member comprising:
a plurality of raised pieces raised from one surface of a base material in a grid pattern, each of the plurality of raised pieces having a proximal end and an extension portion extending from the proximal end, the extension portion abutting one of the cathode side separator and the anode side separator,
wherein the base material is joined to the anode side separator or the cathode side separator at a plurality of joining spots that are located on an opposite side of the deformation absorption member from the one of the cathode side separator and the anode side separator to which the plurality of raised pieces are abutted, each of the plurality of joining spots being located between a first proximal end of a first one of the plurality of raised pieces and a second proximal end of an adjacent one of the plurality of raised pieces, the adjacent one of the plurality of raised pieces being adjacent to the first one of the plurality of raised pieces in an intersecting direction that intersects a first direction taken along the first proximal end of the first one of the plurality of raised pieces to the extension portion of the first one of the plurality of raised pieces,
only a part of the base material between the first one of the plurality of raised pieces and the adjacent one of the plurality of raised pieces being joined to the anode side separator or the cathode side separator that is located on the opposite side of the deformation absorption member such that the base material is not joined to the anode side separator or the cathode side separator that is located on the opposite side of the deformation absorption member along an entire length of the deformation absorption member in the first direction.

2. The deformation absorption member according to claim 1, wherein the first one of the plurality of raised pieces and the adjacent one of the plurality of raised pieces are formed such that the extension portion of the first one of the plurality of raised pieces and the extension portion of the adjacent one of the plurality of raised pieces are aligned in a row along the intersecting direction.

3. The deformation absorption member according to claim 2, wherein
    each of the plurality of raised pieces is formed in a rectangular shape having four corners, and
    the plurality of joining spots are formed in at least one corner of the four corners of the rectangular shape, adjacent to the proximal end of any one of the plurality of raised pieces.

4. The deformation absorption member according to claim 1, wherein the first one of the plurality of raised pieces and the adjacent one of the plurality of raised pieces are formed such that the extension portion of the first one of the plurality of raised pieces and the extension portion of the adjacent one of the plurality of raised pieces are varied so as to be opposed to each other along the intersecting direction.

5. The deformation absorption member according to claim 4, wherein
    each of the plurality of raised pieces is formed in a rectangular shape having four corners, and
    the plurality of joining spots are formed in at least one corner of the four corners of the rectangular shape, adjacent to the proximal end of any one of the plurality of raised pieces.

6. The deformation absorption member according to claim 1, wherein
    each of the plurality of raised pieces is formed in a rectangular shape having four corners, and
    the plurality of joining spots are formed in at least one corner of the four corners of the rectangular shape, adjacent to the proximal end of any one of the plurality of raised pieces.

7. An attachment method for a deformation absorption member disposed between an anode side separator and a cathode side separator, the deformation absorption member comprising a base material and a plurality of raised pieces raised from one surface of the base material in a grid pattern, the attachment method comprising:
    arranging an extension portion extending from a proximal end of each of the plurality of raised pieces to be disposed so as to abut one of the cathode side separator and the anode side separator, and
    joining the base material to the anode side separator or the cathode side separator at a plurality of joining spots that are located on an opposite side of the deformation absorption member from the one of the cathode side separator and the anode side separator to which the plurality of raised pieces are abutted, each of the plurality of joining spots being located between a first proximal end of a first one of the plurality of raised pieces and a second proximal end of an adjacent one of the plurality of raised pieces, the adjacent one of the plurality of raised pieces being adjacent to the first one of the plurality of raised pieces in an intersecting direction that intersects a first direction taken along the first proximal end of the first one of the plurality of raised pieces to the extension portion of the first one of the plurality of raised pieces,
    only a part of the base material between the first one of the plurality of raised pieces and the adjacent one of the plurality of raised pieces being joined to the anode side separator or the cathode side separator that is located on the opposite side of the deformation absorption member such that the base material is not joined to the anode side separator or the cathode side separator that is located on the opposite side of the deformation absorption member along an entire length of the deformation absorption member in the first direction.

8. The attachment method according to claim 7, wherein each of the plurality of joining spots is formed by one of welding, brazing, diffusion bonding, or thermocompression bonding.

* * * * *